United States Patent
Rane et al.

(10) Patent No.: US 10,069,631 B2
(45) Date of Patent: Sep. 4, 2018

(54) FAULT-TOLERANT AGGREGATION OF ENCRYPTED DATA IN A STAR NETWORK

(71) Applicant: Palo Alto Research Center Incorporated, Palo Alto, CA (US)

(72) Inventors: Shantanu Rane, Menlo Park, CA (US); Alejandro E. Brito, Mountain View, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 205 days.

(21) Appl. No.: 15/073,330

(22) Filed: Mar. 17, 2016

(65) Prior Publication Data

US 2017/0272246 A1  Sep. 21, 2017

(51) Int. Cl.
*H04L 9/30* (2006.01)
*H04L 9/00* (2006.01)
*G06F 21/62* (2013.01)
*H04L 9/08* (2006.01)

(52) U.S. Cl.
CPC ............ *H04L 9/30* (2013.01); *G06F 21/6218* (2013.01); *H04L 9/008* (2013.01); *H04L 9/085* (2013.01); *H04L 2209/46* (2013.01)

(58) Field of Classification Search
CPC . H04L 9/30; H04L 9/008; H04L 9/085; H04L 2209/46; G06F 21/6218
See application file for complete search history.

(56) References Cited

U.S. PATENT DOCUMENTS

| | | | | |
|---|---|---|---|---|
| 6,182,214 | B1* | 1/2001 | Hardjono | H04L 9/085 380/255 |
| 7,167,565 | B2* | 1/2007 | Rajasekaran | H04L 9/085 380/278 |
| 7,792,300 | B1* | 9/2010 | Caronni | G06Q 20/3829 380/259 |
| 8,750,508 | B2* | 6/2014 | Rane | H04L 63/0407 380/265 |
| 9,705,908 | B1* | 7/2017 | Thakurta | G06N 99/005 |
| 9,747,467 | B2* | 8/2017 | Yamaoka | G06F 21/6254 |
| 9,894,089 | B2* | 2/2018 | Thakurta | G06N 99/005 |
| 9,942,044 | B2* | 4/2018 | Sullivan | H04L 9/3226 |

(Continued)

*Primary Examiner* — Yonas A Bayou
(74) *Attorney, Agent, or Firm* — Shun Yao; Park, Vaughan, Fleming & Dowler LLP

(57) ABSTRACT

One embodiment provides a system that facilitates encrypted-domain aggregation of data in a star network. During operation, the system receives a set of ciphertexts, representing respective encrypted polynomial shares, of an input value from each participant in a plurality of participants. Each ciphertext in the set of ciphertexts is associated with a specific participant in the plurality of participants. The system computes an encrypted partial value for each participant by aggregating in the encrypted-domain a respective ciphertext associated with that participant received from the plurality of participants and sends a message comprising the encrypted partial value to that participant. This encrypted partial value is encrypted based on a public key of a corresponding participant. The system receives a decrypted partial value from each participant and computes a target value based on a set of decrypted partial values received from a set of participants in the plurality of participants.

20 Claims, 8 Drawing Sheets

(56) References Cited

U.S. PATENT DOCUMENTS

| | | | |
|---|---|---|---|
| 2006/0274899 A1* | 12/2006 | Zhu | H04L 9/083 380/281 |
| 2007/0140479 A1* | 6/2007 | Wang | H04L 9/008 380/30 |
| 2011/0135096 A1* | 6/2011 | Rane | H04L 9/3093 380/278 |
| 2011/0283099 A1* | 11/2011 | Nath | H04L 9/008 713/150 |
| 2012/0204026 A1* | 8/2012 | Shi | H04L 9/3006 713/155 |

* cited by examiner

FAULT-TOLERANT AGGREGATION OF ENCRYPTED DATA IN A STAR NETWORK

BACKGROUND

Field

This disclosure is generally related to the aggregation of data from a plurality of devices. More specifically, this disclosure is related to the aggregation of encrypted data in a star network.

Related Art

The proliferation of the Internet and e-commerce continues to create a vast amount of digital content from a large number of devices. Individual contributors can send their local data to an aggregation entity, which can aggregate such data for measurement. For example, power consumption data can be aggregated by a utility company from a large number of smart meters. Similarly, health monitoring entities can compute statistical measures on fitness-related data provided by wearables (e.g., smartwatches) and smartphones, and online entities can obtain statistics on browser activity from Internet users.

Although users may consent to the aggregation of individual data in return for value-added services, the users may be reluctant to share personal information about their individual behavior. In the above examples, power usage data reveal information about the homeowner's daily patterns, fitness data may reveal sensitive medical information, and browser activity can reveal intimate details of an individual's life. The main privacy constraint in this interaction between untrusted entities is that the data held by any individual user should not be revealed to any other participant or the aggregator.

To facilitate secure aggregation, each user should obfuscate its input so that all the obfuscated inputs can later be combined by the aggregator to compute the aggregated value. However, in a star connected topology, users don't communicate with each other. As a result, a user can only encrypt its local data using its own unique key, which is unknown to any other entity.

SUMMARY

One embodiment provides a system that facilitates encrypted-domain aggregation of data in a star network. During operation, the system receives a set of ciphertexts of an input value from each participant in a plurality of participants via the star network. The set of ciphertexts represents respective encrypted polynomial shares of the input value of that participant. Each ciphertext in the set of ciphertexts is associated with a specific participant in the plurality of participants. The system computes an encrypted partial value for each participant by aggregating in the encrypted-domain a respective ciphertext associated with that participant received from the plurality of participants and sends a message comprising the encrypted partial value to that participant. This encrypted partial value is encrypted based on a public key of a corresponding participant. The system receives a decrypted partial value from each participant and computes a target value based on a set of decrypted partial values received from a set of participants in the plurality of participants.

In a variation on this embodiment, the public key of each participant is based on a homomorphic cryptosystem.

In a variation on this embodiment, the aggregation of a respective ciphertext associated with each participant is a computation of one of: a summation, a weighted summation, a histogram, a mean, variance and higher moments, a linear combination, a classifier output, and a count query.

In a variation on this embodiment, the system sends a large prime number to the plurality of participants. Each ciphertext is a participant value encrypted using the public key of the corresponding participant. The system generates the participant value for each participant by evaluating a polynomial at a known value corresponding to that participant modulo the large prime number and using the input value associated with that participant.

In a variation on this embodiment, the system computes the target value by determining whether the number of participants in the set of participants is greater than a threshold. If the number of participants is greater than the threshold, the system determines a set of coefficients of a target polynomial. The system then evaluates the target polynomial based on a base value and the coefficients.

In a variation on this embodiment, the system divides the plurality of participants into a number of cohorts, assigns an obfuscator to a respective cohort, and computes a target value for a respective cohort. The obfuscator adds an obfuscation value to its input value. Hence, the target value computed for a cohort includes the obfuscation value.

In a further variation, the plurality of participants are obfuscators of a previous round. A participant, which is not an obfuscator in a cohort, then includes a negative obfuscation value in a ciphertext to cancel the effect of the obfuscation value included in the previous round.

In a further variation, the system determines a number of current participants to be less than or equal to a cohort size, forms a final cohort with the current participants without an obfuscator, and computes a target value for the final cohort.

In a variation on this embodiment, computing an encrypted partial value comprises including a random value (e.g., an additive random value) in the aggregation.

BRIEF DESCRIPTION OF THE FIGURES

In the figures, like reference numerals refer to the same figure elements.

DETAILED DESCRIPTION

Figure 1A:
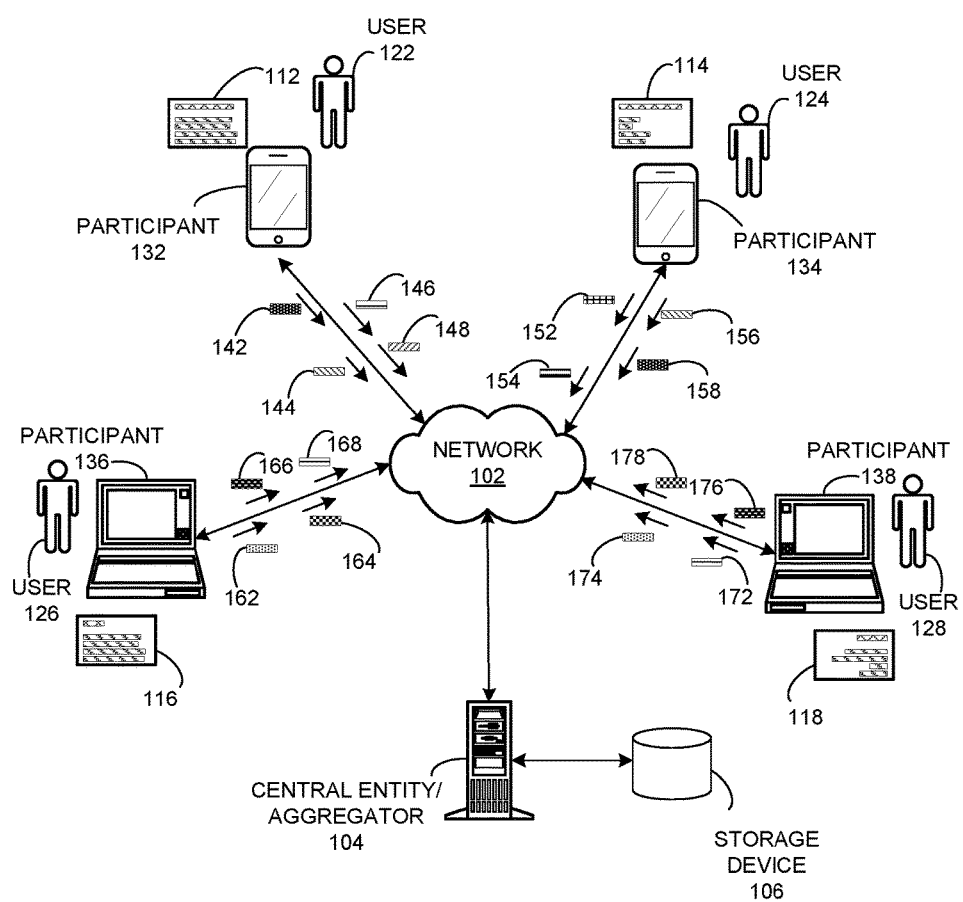
FIG. 1A illustrates an exemplary distributed collection of encrypted data for individual participants via a star network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system and a method which aggregate encrypted data in a star network. A large number of user devices in the star network can generate data. Such devices can be referred to as participants. In a star network, these participants are only coupled to a central entity and not with each other. An aggregator (e.g., a hardware device or a piece of software running on a server), which can be or can reside in the single entity, can collect and aggregate these participants' data for computing a target value of interest (e.g., average power usage in a month). Examples of such aggregation include, but are not limited to: summation, weighted summation, histogram, a mean, variance and higher moments, linear combinations, classifier, and count query.

Such aggregation requires obtaining the target value of interest without exposing individual participant's data to the aggregator. Typically, a common key of a homomorphic cryptosystem can be used to obtain the target value of interest without decrypting individual data. However, in a star network, each participant uses its own key for encryption. As a result, the encrypted data received by the aggregator does not have a common key. If the aggregator distributes a common key to the participants, the data from individual participants becomes exposed to the aggregator. On the other hand, a trusted entity distinct from the aggregator can distribute encryption keys to the participants and ensure that the keys are removed when the aggregator combines the result in a prescribed way. However, this approach introduces the risk of privacy loss if the trusted entity colludes with the aggregator. In addition, if a participant shares its data and becomes unavailable (e.g., goes offline), the target value of interest computed by the aggregator becomes error-prone.

To solve this problem, embodiments of the present invention facilitate fault-tolerant aggregation of encrypted data in a star network. During operation, each participant generates a polynomial, which includes a constant coefficient representing the user data (which can also be referred to as the input data of the participant) and a set of secret coefficients. The participant evaluates the polynomial for a set of distinct known points. In some embodiments, the number of such known points is the number of participants and each distinct point corresponds to a participant. The value generated by evaluating the polynomial at a distinct point associated with a participant can be referred to as the participant value for that participant. The participant encrypts a respective participant value using the public key of the corresponding participant and sends that encrypted value to the aggregator.

The aggregator then homomorphically aggregates the encrypted participant values for a specific participant received from all participants. In this way, the aggregator obtains encrypted partial value of interest at each of the distinct known points. Since each of such encrypted partial value of interest is encrypted based on the public key of one of the participants, the aggregator sends the encrypted partial value of interest to the corresponding participant. In some embodiments, the aggregator homomorphically adds a random value to the encrypted partial value, to obtain an encrypted perturbed partial value of interest, thereby ensuring that the participant cannot discover the partial value of interest. The participant decrypts the encrypted perturbed partial value of interest to obtain the partial value of interest. However, since this value is a partial sum, even after the decryption, the participant does not have access to individual input data or the target value of interest. Upon receiving the decrypted partial values of interest, the aggregator performs a polynomial interpolation to obtain the coefficients of a target polynomial, whose constant value includes the aggregated constant coefficients from all participants, and hence, represents the target value of interest. The aggregator then evaluates the target polynomial (e.g., at a value of "0") to obtain the aggregated constant coefficients.

This aggregation process can be referred to as the encrypted aggregation technique. The performance of the technique can be further improved based on a hierarchical computation. The aggregator can group the participants into smaller cohorts comprising a smaller number of participants and select one participant in each cohort as an untrusted obfuscator. The aggregator executes the encrypted aggregation technique for each cohort. However, the obfuscator of each cohort masks its input data by a random value, thereby providing the aggregator with an incorrect aggregation for each cohort. In the next stage, the aggregator considers the obfuscators as current participants.

The aggregator groups the obfuscators (i.e., the current participants) into new cohorts, and assigns an obfuscator for each cohort. At this stage, each current participant that is not the obfuscator uses a value that reverses the masking operation of the previous round as the input data. Then, the aggregator again executes the encrypted aggregation technique for each cohort. The aggregator continues this process until only one cohort can be formed. At this round, the aggregator does not choose any obfuscator and executes the encrypted aggregation technique for the final cohort. Since the final cohort does not have an obfuscator, each remaining participant uses a value that reverses the masking operation of the previous round as the input data. As a result, after executing the encrypted aggregation technique for the final cohort, the aggregator obtains the target value of interest for all participants.

Exemplary Network and Communication

FIG. 1A illustrates an exemplary distributed collection of encrypted data for individual participants via a star network, in accordance with an embodiment of the present invention. In this example, a large number of participants 132, 134, 136, and 138 are coupled to a star network 102. In some embodiments, these participants are user devices for users 122, 124, 126, and 128, respectively. It should be noted that the user data generated from a user device may not depend on a user's interaction with the device (e.g., a smart meter measuring electricity usage at the home of a user). Participants 132, 134, 136, and 138 are only coupled to a central entity 104 and not with each other.

In some embodiments, central entity 104 can operate as an aggregator 104, which can collect and aggregate input data from participants 132, 134, 136, and 138 for computing a target value of interest (e.g., average power usage in a month). Examples of such aggregation include, but are not limited to, summation, weighted summation, histogram, mean, variance and higher moments, linear combinations, classifier, and count query. Such aggregation requires obtaining the target value of interest without exposing any individual participant's data to aggregator 104. However, in star network 102, the encrypted data from participants 132, 134, 136, and 138 does not have a common key. If aggregator 104 distributes a common key, the data from participants 132, 134, 136, and 138 becomes exposed to aggregator 104. Furthermore, a key management entity can also expose the data from participants 132, 134, 136, and 138 to aggregator 104. In addition, if a participant, such as participant 132, becomes unavailable, the target value of interest computed by aggregator 104 becomes error-prone.

To solve this problem, aggregator 104, in conjunction with participants 132, 134, 136, and 138, facilitates fault-tolerant aggregation of encrypted data in network 102. Suppose that participants 132, 134, 136, and 138 have input data 112, 114, 116, and 118, respectively, for aggregator 104. During operation, aggregator 104 sends a large prime number, p, to participants 132, 134, 136, and 138. Upon receiving the prime number, participant 132 generates a polynomial, which includes a constant coefficient representing input data 112 and a set of secret coefficients. In some embodiments, the polynomial can be of the form: $p^{(i)}(x)=d_i+p_1^{(i)}x+p_2^{(i)}x^2+\ldots+p_n^{(i)}x^n$ mod p. Here, $d_i$ represents input data 112. If there are m participants, n<m. It should also be noted that evaluating the polynomial at a value of "0" yields input data 112 (i.e., $p^{(i)}(0)=d_i$), wherein i corresponds to participant 132. Participant 132 evaluates the polynomial at four distinct known points to generate participant values 142, 144, 146, and 148 for participants 132, 134, 136, and 138, respectively. Here, each distinct point corresponds to a participant.

Participant 132 encrypts participant values 142, 144, 146, and 148 using the public keys of participants 132, 134, 136, and 138, respectively. Suppose that a distinct point j is associated with participant 132. If $k_j$ is a public key for participant 132, the encrypted participant value 142, which is referred to as a ciphertext of participant value 142, can be $E_{k_j}(p^{(i)}(j))$. Here, $E_{k_j}$ represents a ciphertext generated based on $k_j$. Participant 132 then sends $E_{k_j}(p^{(i)}(j))$ to aggregator 104. Similarly, participant 132 sends ciphertexts of participant values 144, 146, and 148 to aggregator 104. In some embodiments, the communication between a participant and aggregator 104 includes generating a message, including the value in the message, determining an output for the message, and transmitting the message via the output port.

Similarly, participant 134 evaluates its polynomial at the same four distinct known points, as used by participant 132, to generate participant values 152, 154, 156, and 158 for participants 132, 134, 136, and 138 respectively. In the same way, participant 136 evaluates its polynomial at the same four distinct known points to generate participant values 162, 164, 166, and 168 for participants 132, 134, 136, and 138 respectively. Participant 138 evaluates its polynomial at the same four distinct known points to generate participant values 172, 174, 176, and 178 for participants 132, 134, 136, and 138 respectively. In other words, participants 132, 134, 136, and 138 evaluate the polynomial at the same four distinct known points. Participant 134 encrypts participant values 152, 154, 156, and 158 using the public keys of participants 132, 134, 136, and 138, respectively. Similarly, participant 136 encrypts participant values 162, 164, 166, and 168, and participant 138 encrypts participant values 172, 174, 176, and 178 using the public keys of participants 132, 134, 136, and 138, respectively. Participants 134 136, and 138 then send their respective ciphertexts to aggregator 104.

Figure 1B:
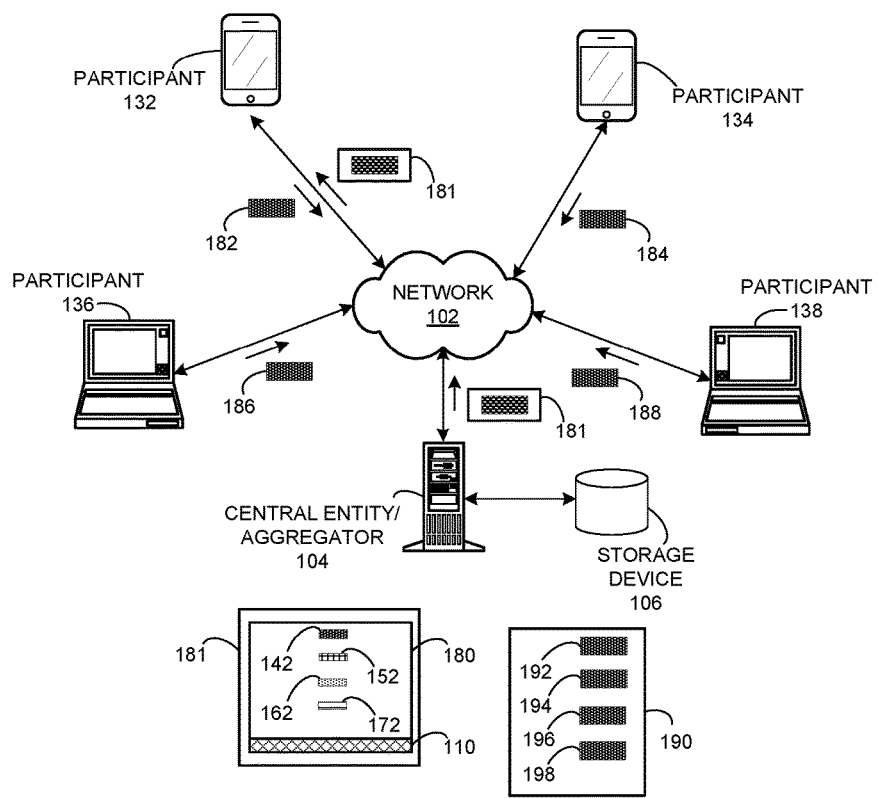
FIG. 1B illustrates an exemplary encrypted data aggregation in a star network, in accordance with an embodiment of the present invention.

FIG. 1B illustrates an exemplary encrypted data aggregation in a star network, in accordance with an embodiment of the present invention. Upon receiving the ciphertexts, aggregator 104 homomorphically aggregates the ciphertexts for a specific participant received from all participants. For example, participant values 142, 152, 162, and 172 are for participant 132 from participants 132, 134, 136, and 138, respectively. Aggregator 104 homomorphically aggregates the ciphertexts of participant values 142, 152, 162, and 172 to generate encrypted partial value of interest 180 for participant 132. In some embodiments, aggregator 104 adds a random value 110 (e.g., an additive random value) to encrypted partial value of interest 180 to mask the value from participant 132 to generate encrypted perturbed partial value of interest 181.

If distinct point j is associated with participant 132 and the aggregation operation is a summation, aggregator 104 computes $$\prod_{i=1}^{m} E_{k_j}(p^{(i)}(j))$$

to obtain an encrypted partial value of interest 180 as $$E_{k_j}\left(\sum_{i=1}^{m} p^{(i)}(j)\right),$$

wherein i corresponds to participants 132, 134, 136, and 138, and m=4. If random value 110 generated by aggregator 104 is $r_j$, encrypted perturbed partial value of interest 181 becomes $$E_{k_j}\left(r_j + \sum_{i=1}^{m} p^{(i)}(j)\right).$$

As a result, when participant 132 decrypts encrypted partial value of interest 181, participant 132 cannot obtain $$\sum_{i=1}^{m} p^{(i)}(j).$$

In this way, aggregator 104 obtains encrypted partial value of interest 180 at distinct known point j.

Since encrypted perturbed partial value of interest 181 is encrypted based on the public key of participant 132, aggregator 104 sends encrypted perturbed partial value of interest 181 to participant 132. Participant 132 then decrypts encrypted perturbed partial value of interest 181 to obtain decrypted perturbed partial value of interest 182. It should be noted that decrypted perturbed partial value of interest $$182\left(e.g., r_j + \sum_{i=1}^{m} p^{(i)}(j)\right)$$

includes a random value (e.g., $r_j$) to mask the actual partial value of interest $$\left(e.g., \sum_{i=1}^{m} p^{(i)}(j)\right).$$

Participant 132 sends decrypted perturbed partial value of interest 182 to aggregator 104. In the same way, participants 134, 136, and 138 send decrypted perturbed partial values of interest 184, 186, and 188, respectively, to aggregator 104.

Upon receiving decrypted perturbed partial values of interest 182, 184, 186, and 188, aggregator 104 removes the random values from decrypted perturbed partial values of interest 182, 184, 186, and 188 to obtain the corresponding partial values of interest 192, 194, 196, and 198. Aggregator 104 then can compute a coefficient for a distinct point. For example, for distinct point j, aggregator 104 can compute the coefficient $$q(j) = \sum_{i=1}^{m} p^{(i)}(j) \bmod p.$$

If aggregator 104 receives decrypted partial values of interest at least from a number of participants greater than a threshold (e.g., n+1), aggregator 104 can perform a polynomial interpolation to obtain the coefficients of a target polynomial. This target polynomial can be of format $$p(x) = q_1 x + q_2 x^2 + \ldots + q_n x^n + \sum_{i=1}^{m} d_i \bmod p.$$

Aggregator 104 then evaluates the target polynomial at a value of "0" to obtain target value of interest 190.

In a star network, all participants may not be online at all times. After providing the ciphertexts of participant values to aggregator 104, a participant may become unavailable (e.g., go offline). However, if at least n+1 participants are available out of m participants, wherein n<m, aggregator 104 can use polynomial interpolation to derive the coefficients of the target polynomial (e.g., $q_1, q_2, \ldots, q_n$). The aggregator can use the derived coefficients to evaluate the target polynomial at a value of "0" (i.e., a base value) to obtain the target value of interest. This provides fault tolerance to the encrypted aggregation process even when (m−n−1) participants become unavailable. This fault tolerance also facilitates dynamic increase or decrease of the number of participants (i.e., dynamic addition or deletion of participants).

Computations for Encrypted Aggregation

Figure 2A:
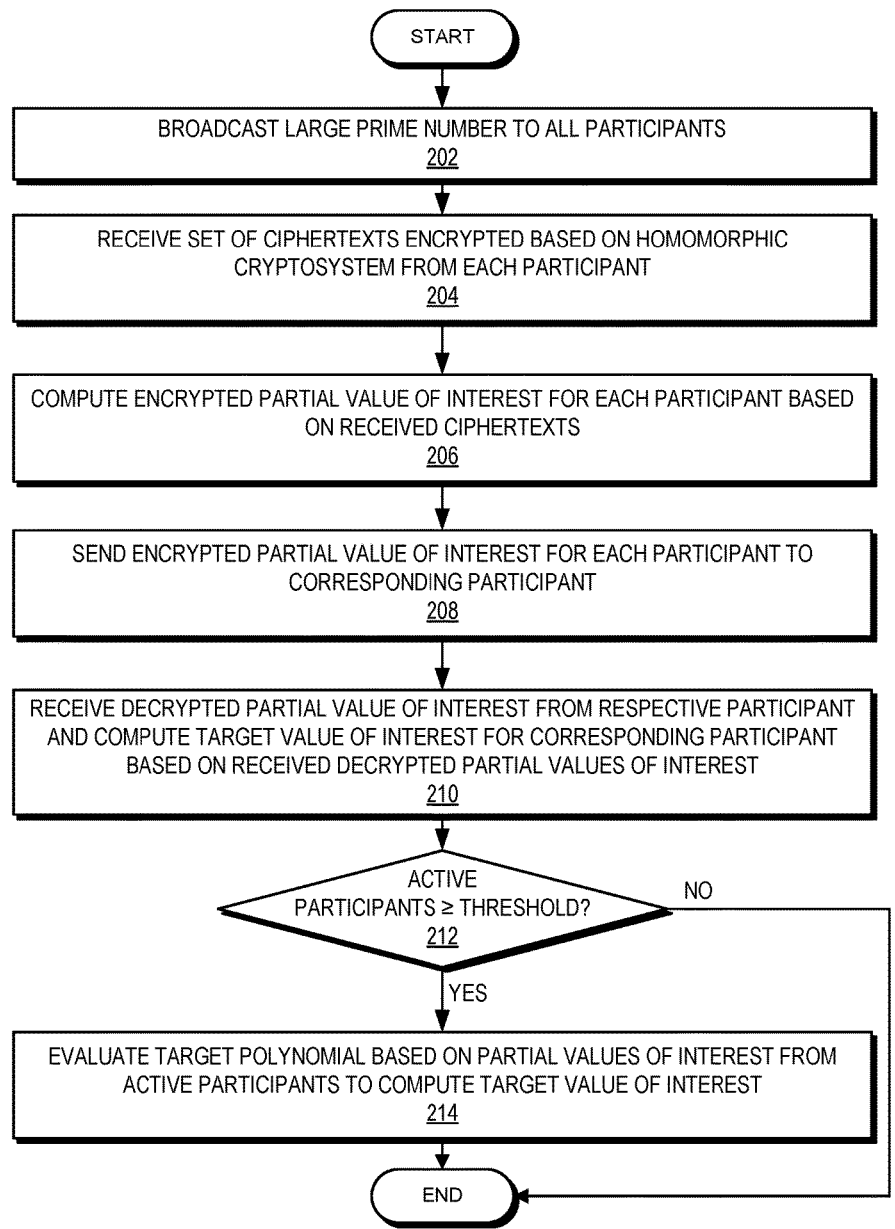
FIG. 2A presents a flow chart illustrating a method for an aggregator facilitating encrypted data aggregation in a star network, in accordance with an embodiment of the present invention.

FIG. 2A presents a flow chart illustrating a method for an aggregator facilitating encrypted data aggregation in a star network, in accordance with an embodiment of the present invention. During operation, the aggregator broadcasts a large prime number to all participants (operation 202). The aggregator receives a set of ciphertexts encrypted based on a homomorphic cryptosystem for each participant (operation 204), as described in conjunction with FIG. 1A. The aggregator computes an encrypted partial value of interest for each participant based on received ciphertexts (operation 206) and sends the encrypted partial value of interest for each participant to the corresponding participant (operation 208), as described in conjunction with FIG. 1B. It should be noted that the encrypted partial value of interest can be an encrypted perturbed partial value of interest.

The aggregator then receives a decrypted partial value of interest from a respective participant and computes the target value of interest for the corresponding participant based on received decrypted partial values of interest (operation 210). The aggregator checks whether the number of active participants is greater than or equal to a threshold (operation 212). If so, the aggregator evaluates a target polynomial based on the partial values of interest from active participants to compute the target value of interest (operation 214), as described in conjunction with FIG. 1B.

Figure 2B:
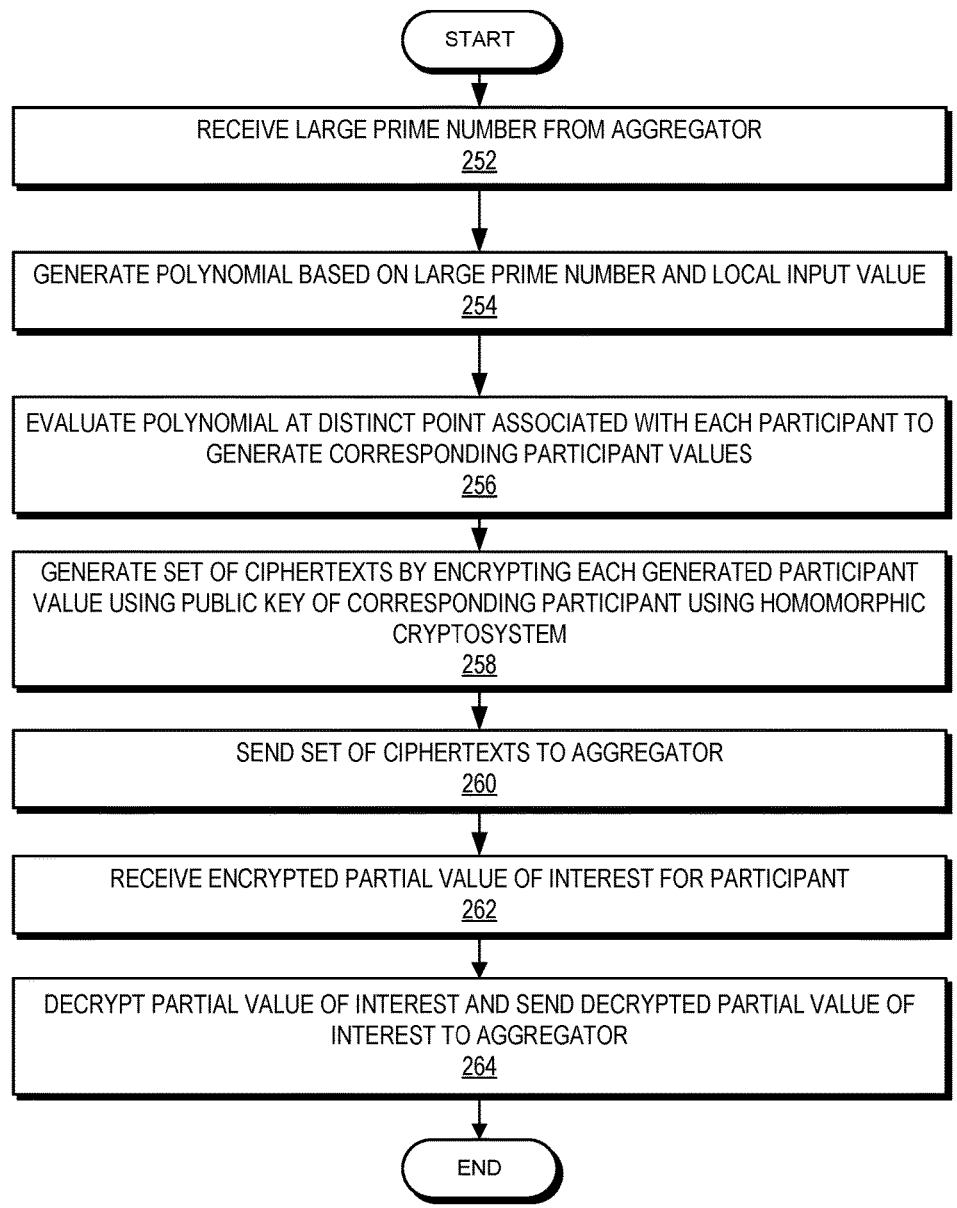
FIG. 2B presents a flow chart illustrating a method for a participant facilitating encrypted data aggregation in a star network, in accordance with an embodiment of the present invention.

FIG. 2B presents a flow chart illustrating a method for a participant facilitating encrypted data aggregation in a star network, in accordance with an embodiment of the present invention. During operation, the participant receives a large prime number from the aggregator (operation 252) and generates a polynomial based on the large prime number and local input value (operation 254). The participant then evaluates the polynomial at a distinct point associated with each participant to generate a corresponding participant value (operation 256), as described in conjunction with FIG. 1A.

The participant generates a set of ciphertexts by encrypting each generated participant value using the public key of the corresponding participant using the homomorphic cryptosystem (operation 258) and sends the set of ciphertexts to the aggregator (operation 260). The participant then receives the encrypted partial value of interest for the participant (operation 262). Here, the partial value of interest is encrypted using the public key of the participant. This encrypted partial value of interest can be an encrypted perturbed partial value of interest. The participant then decrypts the encrypted partial value of interest (e.g., using the private key of the participant) and sends the decrypted partial value of interest to the aggregator (operation 264), as described in conjunction with FIG. 1B.

Hierarchical Encrypted Aggregation

Figure 3:
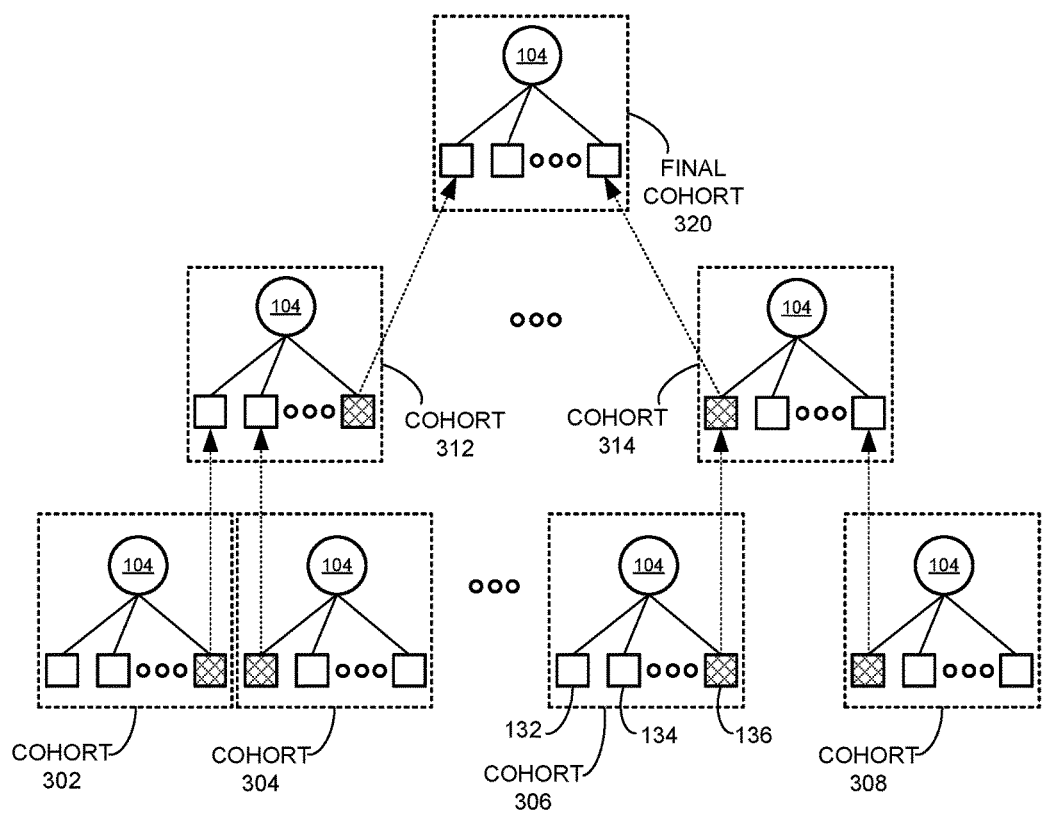
FIG. 3 illustrates an exemplary hierarchical encrypted data aggregation in a star network, in accordance with an embodiment of the present invention.

The performance of the encrypted aggregation technique can be further improved based on a hierarchical computation. FIG. 3 illustrates an exemplary hierarchical encrypted data aggregation in a star network, in accordance with an embodiment of the present invention. In this example, aggregator 104 can group the participants into smaller cohorts 302, 304, 306, and 308 comprising a smaller number of participants. Aggregator 104 then selects one of the participants in each cohort as an untrusted obfuscator. Aggregator 304 executes the encrypted aggregation technique, as described in conjunction with FIGS. 1A and B, for each cohort. The obfuscator of each cohort introduces an obfuscation value, which can be a random value, to its input data at each level of the computation. If the $l^{th}$ participant of the $t^{th}$ cohort is the obfuscator and $d_l^{(t)}$ is its input value, the obfuscator chooses a random value (e.g., an integer) $s_t$ and uses $d_l^{(t)} + s_t$ as the input value.

For example, participants 132, 134, and 136 can be members of cohort 306. Aggregator 104 can select participant 136 as an untrusted obfuscator for cohort 306. Here, participant 136 masks its input data with the obfuscation value. As a result, aggregator 104 receives an incorrect aggregation cohort 306. Aggregator 104 executes the encrypted aggregation technique for cohort 306. However, participants of cohort 306 provide aggregator 104 with an incorrect aggregation due to the obfuscation value. This initial round can be referred to as the computation round. In the next round, the aggregator considers the obfuscators as current participants. For example, aggregator 104 considers participant 136, which is an obfuscator of the previous round, as a current participant.

Aggregator 104 groups the obfuscators (i.e., the current participants) into new cohorts 312 and 314, and assigns an obfuscator for each cohort. Aggregator 104 assigns participant 136 as the obfuscator for cohort 314. At this stage, each current participant that is not the obfuscator uses a value that reverses the masking operation of the previous round as the input data. In cohort 314, all participants except participant 136 use a value that reverses the masking operation of the previous round as the input data. If the participant has used $d_i^{(t)}+s_t$ as the input value of the previous round, the participant uses $(-s_t)$ as the input value. Then, aggregator 104 again executes the encrypted aggregation technique for cohorts 312 and 314.

Aggregator 104 continues this process until the number of current participants is less than or equal to the size of a cohort. These current participants can be referred to as the final participants. Aggregator 104 then forms a final cohort 320 comprising the final participants. At this round, aggregator 104 does not choose any obfuscator for final cohort 320 and executes the encrypted aggregation technique for final cohort 320. Since final cohort 320 does not have an obfuscator, each remaining participant uses a value that reverses the masking operation of the previous round (e.g., $(-s_t)$) as the input data. As a result, after executing the encrypted aggregation technique for final cohort 320, aggregator 104 obtains the target value of interest for all participants.

Computations for Hierarchical Encrypted Aggregation

Figure 4A:
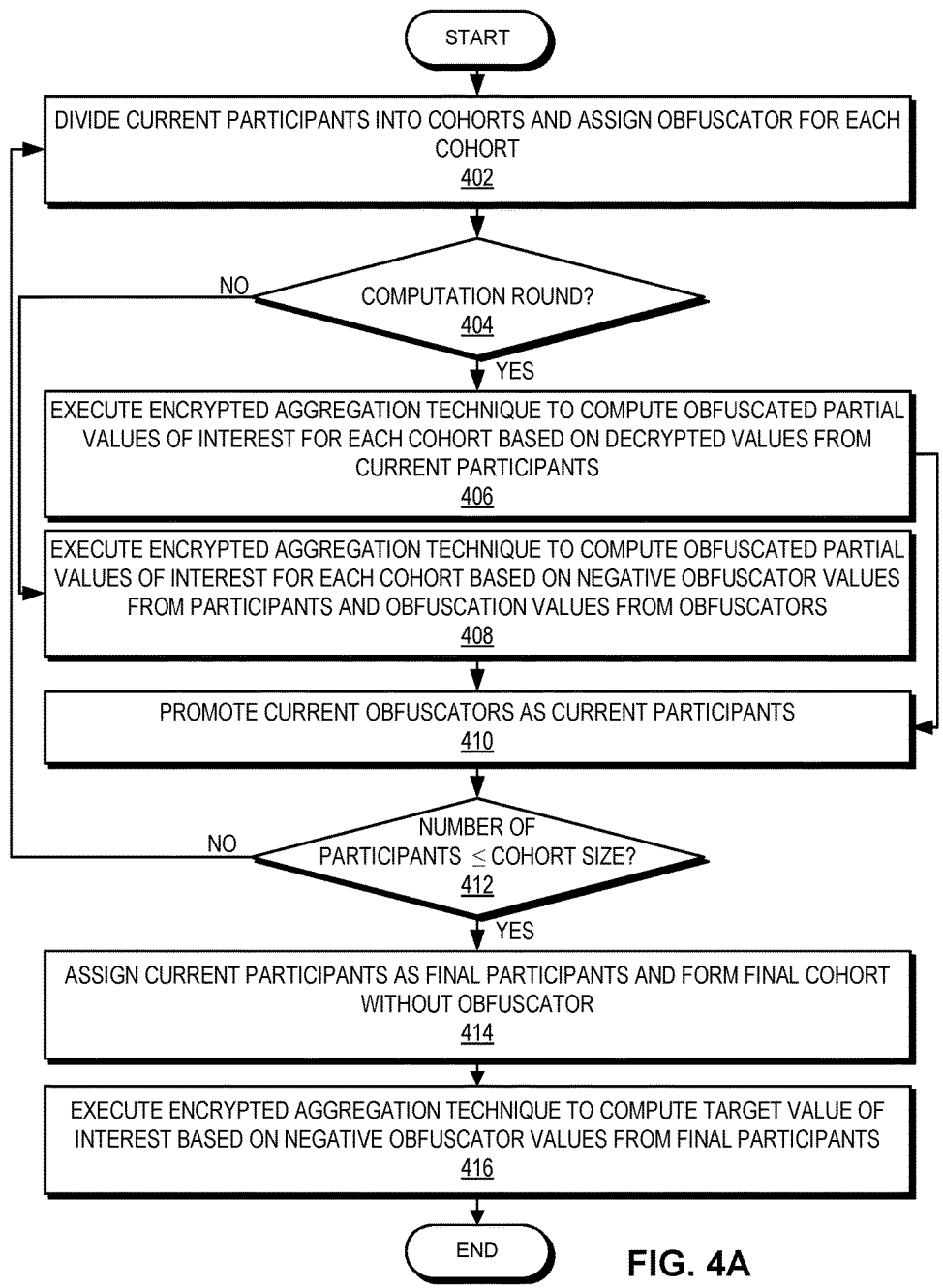
FIG. 4A presents a flow chart illustrating a method for an aggregator facilitating hierarchical encrypted data aggregation in a star network, in accordance with an embodiment of the present invention.

FIG. 4A presents a flow chart illustrating a method for an aggregator facilitating hierarchical encrypted data aggregation in a star network, in accordance with an embodiment of the present invention. During operation, the aggregator divides the current participants into cohorts and assigns an obfuscator for each cohort (operation 402). The aggregator then checks whether the current round is the computation round (operation 404). If the current round is the computation round, the aggregator executes the encrypted aggregation technique to compute the obfuscated partial value of interest for each cohort based on the decrypted values of interest from current participants (operation 406). The decrypted values of interest include obfuscation values from the obfuscators.

If the current round is not the computation round, the current participants are the obfuscators of the previous round. The aggregator then executes the encrypted aggregation technique to compute the obfuscated partial value of interest for each cohort based on the negative obfuscation values from the participants and the negative obfuscation values from the obfuscators (operation 408). Upon executing the encrypted aggregation technique (operation 406 or 408), the aggregator promotes the current obfuscators as the current participants for the next round (operation 410).

The aggregator checks whether the number of current participants is less than or equal to a cohort size. If the number of current participants is not less than or equal to (i.e., is greater than) a cohort size, the aggregator continues to divide the current participants into cohorts and assigns an obfuscator for each cohort (operation 402). If the number of current participants is less than or equal to a cohort size, the aggregator assigns the current participants as the final participants and forms a final cohort without an obfuscator (operation 414). The aggregator then executes the encrypted aggregation technique to compute the target value of interest for each cohort based on the negative obfuscation values from the final participants (operation 416).

Figure 4B:
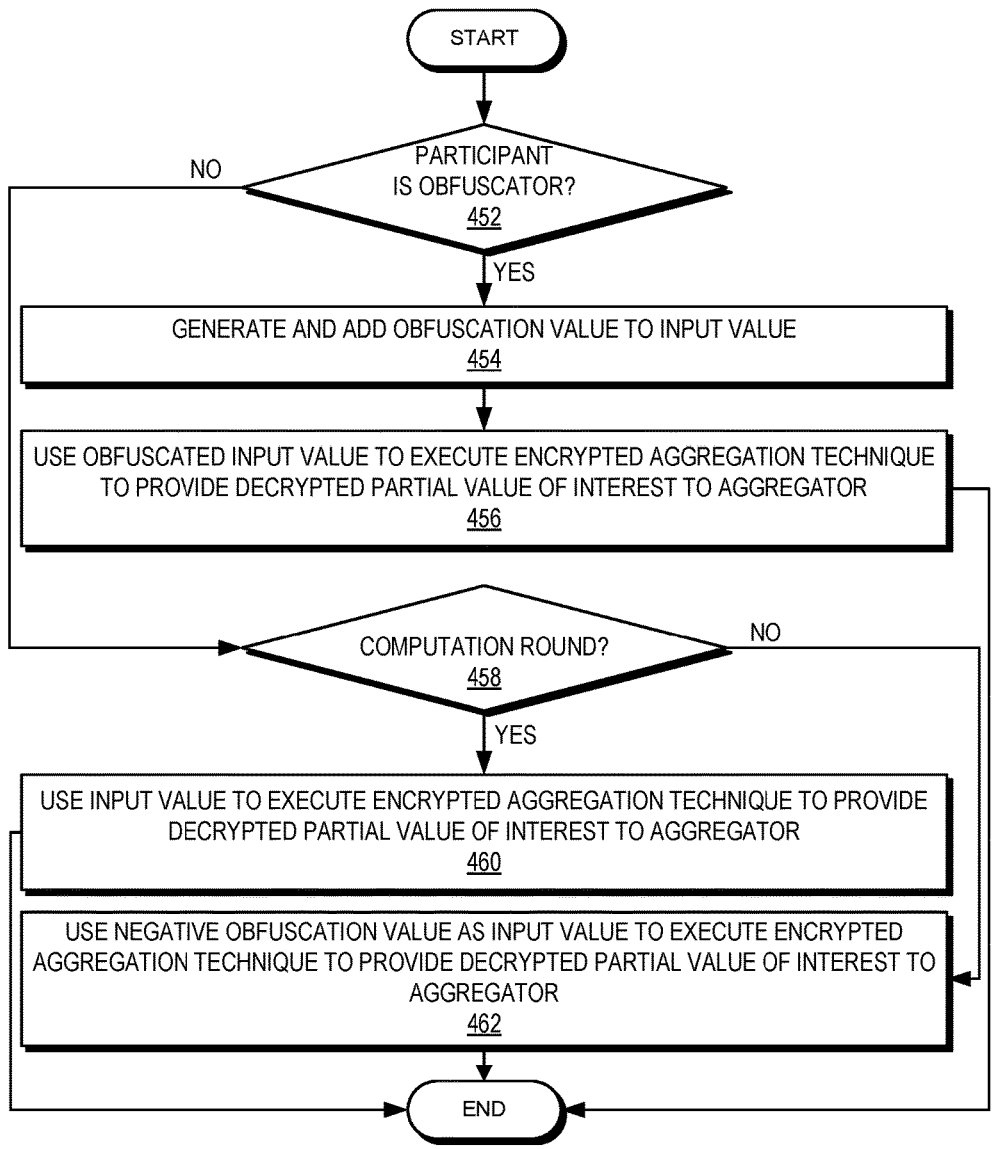
FIG. 4B presents a flow chart illustrating a method for a participant facilitating hierarchical encrypted data aggregation in a star network, in accordance with an embodiment of the present invention.

FIG. 4B presents a flow chart illustrating a method for a participant facilitating hierarchical encrypted data aggregation in a star network, in accordance with an embodiment of the present invention. During operation, the participant checks whether the participant is an obfuscator for the current round (operation 452). If the participant is an obfuscator for the current round, the participant generates and adds an obfuscation value to the input value (operation 454) and uses the obfuscated input value to execute the encrypted aggregation technique to provide a decrypted partial value of interest to the aggregator (operation 456).

If the participant is not an obfuscator for the current round (e.g., is a regular participant), the participant checks whether the current round is the computation round (operation 458). If the current round is the computation round, the participant uses the input value to execute the encrypted aggregation technique to provide a decrypted partial value of interest to the aggregator (operation 460). On the other hand, if the current round is not the computation round, the participant uses the negative obfuscation value as the input value to execute the encrypted aggregation technique to provide a decrypted partial value of interest to the aggregator (operation 462).

Exemplary Computer and Communication System

Figure 5:
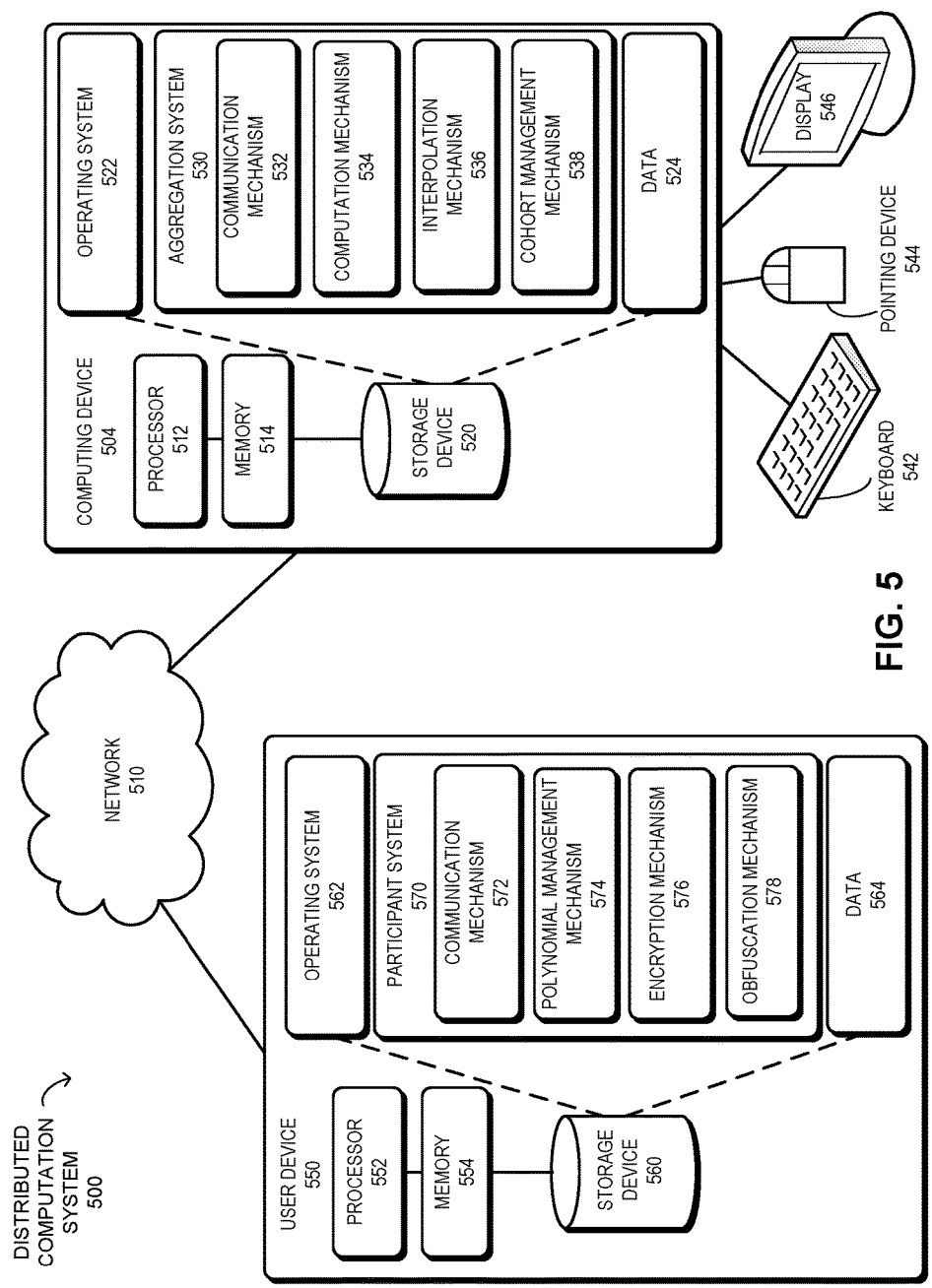
FIG. 5 illustrates an exemplary distributed computer and communication system that facilitates encrypted data aggregation in a star network, in accordance with an embodiment of the present invention.

FIG. 5 illustrates an exemplary distributed computer and communication system that facilitates encrypted data aggregation in a star network, in accordance with an embodiment of the present invention. A distributed computation system 500 includes a computing device 504 and a user device 550. Computing device 504 can operate as an aggregator coupled to a star network 510. User device 550 can operate as a participant coupled to network 510.

Computing device 504 includes a processor 512, a memory 514, and a storage device 520. Memory 514 can include a volatile memory (e.g., Random Access Memory (RAM)) that serves as a managed memory, and can be used to store one or more memory pools. Furthermore, computing device 504 can be coupled to a display device 546, a keyboard 542, and a pointing device 544. Storage device 520 can store an operating system 522, an aggregation system 530, and data 524. Data 524 can include any data received from user device 550 and data computed by aggregation system 530. Aggregation system 530 allows computing device 504 to operate as an aggregator.

Aggregation system 530 can include instructions, which when executed by computing device 504, can cause computing device 504 to perform methods and/or processes described in this disclosure. Specifically, aggregation system 530 may include instructions for sending messages to and receiving messages from user device 550 (communication mechanism 532). For example, aggregation system 530 can send a large prime number to user device 550. Aggregation system 530 can also include instructions for computing a partial encrypted value of interest, an obfuscated partial encrypted value of interest, and a target encrypted value of interest (e.g., based on a homomorphic cryptosystem) (computation mechanism 534). Aggregation system 530 can include instructions for computing coefficients for a target polynomial (e.g., based on polynomial interpolation) (interpolation mechanism 536).

User device 550 includes a processor 552, a memory 554, and a storage device 560. Memory 554 can include a volatile memory (e.g., RAM) that serves as a managed memory, and can be used to store one or more memory pools. Storage device 560 can store an operating system 562, a participant system 570, and data 564. Data 564 can include any data received from computing device 504 and data computed by participant system 570. Participant system 570 allows user device 550 to operate as a participant.

Participant system 570 can include instructions, which when executed by user device 550, can cause user device 550 to perform methods and/or processes described in this disclosure. Specifically, participant system 570 may include instructions for sending messages to and receiving messages from computing device 504 (communication mechanism 572). Participant system 570 can also include instructions for generating a polynomial and evaluating the polynomial for different participants (polynomial management mechanism 574). Participant system 570 can include instructions for encrypting and decrypting data based on a homomorphic public key cryptosystem (encryption mechanism 576).

In some embodiments, computing device 504 and user device 550 participate in a hierarchical encrypted aggregation technique. Aggregation system 530 then can include instructions for creating cohorts and assigning obfuscators for each cohort (cohort management mechanism 538). Aggregation system 530 then can also include instructions for masking partial value of interest from user device 550 (cohort management mechanism 538). On the other hand, participant system 570 then can include instructions for operating participant system 570 as an obfuscator (obfuscation mechanism 578). Such instructions include instructions for masking the input value of user device 550 with an obfuscation value and using a negative obfuscation value as the input value of user device 550.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating encrypted-domain aggregation of data in a star network of physical devices, the method comprising:
   receiving, by a computing device comprising a microprocessor, a set of ciphertexts of an input value from each participant of a plurality of participants via the star network, wherein a respective participant in the plurality of participants comprises a microprocessor, wherein the set of ciphertexts from a first participant of a plurality of participants represents respective encrypted polynomial shares of the input value of the first participant, and wherein each ciphertext in the set of ciphertexts is associated with a specific participant in the plurality of participants;
   computing an encrypted partial value for the first participant by aggregating in the encrypted-domain a respective ciphertext associated with the first participant received from the plurality of participants, wherein the encrypted partial value is encrypted based on a public key of the first participant;
   sending a message comprising the encrypted partial value for each participant to the corresponding participant;
   receiving a decrypted partial value representing a decryption of the encrypted partial value from each participant; and
   computing a target value based on a subset of the set of decrypted partial values, wherein the subset corresponds to a subset of participants of the plurality of participants;
   wherein computing the target value further comprises:
      in response to the number of participants being greater than a threshold, determining a set of coefficients of a target polynomial; and
      evaluating the target polynomial based on a base value and the coefficients.

2. The method of claim 1, wherein the public key of the first participant is based on a homomorphic cryptosystem.

3. The method of claim 1, wherein the aggregation of a respective ciphertext associated with the first participant is a computation of one of: a summation, a weighted summation, a histogram, a mean, a variance and higher moments, a linear combination, a classifier, and a count query.

4. The method of claim 1, further comprising sending a large prime number to the plurality of participants, wherein the encrypted polynomial share at the first participant is computing using a modulo value using the large prime number.

5. The method of claim 1, wherein computing the target value further comprises:
   determining whether the number of participants in the set of participants is greater than the threshold, wherein the threshold is based on a degree of the polynomial.

6. The method of claim 1, further comprising:
   dividing the plurality of participants into a number of cohorts;
   assigning an obfuscator to a respective cohort, wherein the obfuscator adds an obfuscation value in a ciphertext from the obfuscator; and
   computing a target value for a respective cohort, wherein the target value includes the obfuscation value.

7. The method of claim 6, wherein the plurality of participants are obfuscators of a previous round; and
   wherein a participant, which is not an obfuscator in a cohort, includes a negative obfuscation value in a ciphertext.

8. The method of claim 6, further comprising:
  determining a number of current participants to be less than or equal to a cohort size;
  forming a final cohort with the current participants without an obfuscator; and
  computing a target value for the final cohort.

9. The method of claim 1, wherein computing the encrypted partial value further comprises including a random value in the aggregation.

10. A computer system for facilitating encrypted-domain aggregation of data in a star network of physical devices, the system comprising:
  processing circuitry; and
  a storage device storing instructions that when executed by the processing circuitry cause the processing circuitry to perform a method, the method comprising:
  receiving a set of ciphertexts of an input value from each participant of a plurality of participants via the star network, wherein a respective participant in the plurality of participants comprises a microprocessor, wherein the set of ciphertexts from a first participant of a plurality of participants represents respective encrypted polynomial shares of the input value of the first participant, and wherein each ciphertext in the set of ciphertexts is associated with a specific participant in the plurality of participants;
  computing an encrypted partial value for the first participant by aggregating in the encrypted-domain a respective ciphertext associated with the first participant received from the plurality of participants, wherein the encrypted partial value is encrypted based on a public key of the first participant;
  sending a message comprising the encrypted partial value for each participant to the corresponding participant;
  receiving a decrypted partial value representing a decryption of the encrypted partial value from each participant; and
  computing a target value based on a subset of the set of decrypted partial values, wherein the subset corresponds to a subset of participants of the plurality of participants;
  wherein computing the target value further comprises:
    in response to the number of participants being greater than a threshold, determining a set of coefficients of a target polynomial; and
    evaluating the target polynomial based on a base value and the coefficients.

11. The computer system of claim 10, wherein the public key of the first participant is based on a homomorphic cryptosystem.

12. The computer system of claim 10, wherein the aggregation of a respective ciphertext associated with the first participant is a computation of one of: a summation, a weighted summation, a histogram, a mean, a variance and higher moments, a linear combination, a classifier, and a count query.

13. The computer system of claim 10, wherein the method further comprises sending a large prime number to the plurality of participants, wherein the encrypted polynomial share at the first participant is computed using a modulo value using the large prime number.

14. The computer system of claim 10, wherein computing the target value further comprises:
  determining whether the number of participants in the set of participants is greater than the threshold, wherein the threshold is based on a degree of the polynomial.

15. The computer system of claim 10, wherein the method further comprises:
  dividing the plurality of participants into a number of cohorts;
  assigning an obfuscator to a respective cohort, wherein the obfuscator adds an obfuscation value in a ciphertext from the obfuscator; and
  computing a target value for a respective cohort, wherein the target value includes the obfuscation value.

16. The computer system of claim 15, wherein the plurality of participants are obfuscators of a previous round; and
  wherein a participant, which is not an obfuscator in a cohort, includes a negative obfuscation value in a ciphertext.

17. The computer system of claim 15, wherein the method further comprises:
  determining a number of current participants to be less than or equal to a cohort size;
  forming a final cohort with the current participants without an obfuscator; and
  computing a target value for the final cohort.

18. The computer system of claim 10, wherein computing the encrypted partial value further comprises including a random value in the aggregation.

19. A non-transitory computer-readable storage medium storing instructions that when executed by a computer, which includes a microprocessor, cause the computer to perform a method for facilitating encrypted-domain aggregation of data in a star network of physical devices, the method comprising:
  receiving a set of ciphertexts of an input value from each participant of a plurality of participants via the star network, wherein a respective participant in the plurality of participants comprises a microprocessor, wherein the set of ciphertexts from a first participant of a plurality of participants represents respective encrypted polynomial shares of the input value of the first participant, and wherein each ciphertext in the set of ciphertexts is associated with a specific participant in the plurality of participants;
  computing an encrypted partial value for the first participant by aggregating in the encrypted-domain a respective ciphertext associated with the first participant received from the plurality of participants, wherein the encrypted partial value is encrypted based on a public key of the first participant;
  sending a message comprising the encrypted partial value for each participant to the corresponding participant;
  receiving a decrypted partial value representing a decryption of the encrypted partial value from the first participant; and
  computing a target value based on a subset of the set of decrypted partial values, wherein the subset corresponds to a subset of participants of the plurality of participants; and
  wherein computing the target value further comprises:
    in response to the number of participants being greater than a threshold, determining a set of coefficients of a target polynomial; and
    evaluating the target polynomial based on a base value and the coefficients.

20. The storage medium of claim 19, wherein the method further comprises:
  dividing the plurality of participants into a number of cohorts;

assigning an obfuscator to a respective cohort, wherein the obfuscator adds an obfuscation value in a ciphertext from the obfuscator; and computing a target value for a respective cohort, wherein the target value includes the obfuscation value.

* * * * *